(12) United States Patent
Hirata et al.

(10) Patent No.: US 7,813,019 B2
(45) Date of Patent: Oct. 12, 2010

(54) OPTICAL SCANNING ACTUATOR

(75) Inventors: Takafumi Hirata, Yokohama (JP);
Ryohei Shigematsu, Yokohama (JP)

(73) Assignee: NHK Spring Co., Ltd., Yokohama-shi (JP)

(*) Notice: Subject to any disclaimer, the term of this patent is extended or adjusted under 35 U.S.C. 154(b) by 355 days.

(21) Appl. No.: 11/887,416

(22) PCT Filed: Mar. 6, 2006

(86) PCT No.: PCT/JP2006/304267
§ 371 (c)(1),
(2), (4) Date: Sep. 28, 2007

(87) PCT Pub. No.: WO2006/112184
PCT Pub. Date: Oct. 26, 2006

(65) Prior Publication Data
US 2009/0128877 A1 May 21, 2009

(30) Foreign Application Priority Data
Mar. 31, 2005 (JP) ............... 2005-105245

(51) Int. Cl.
*G02B 26/08* (2006.01)
(52) U.S. Cl. .............. 359/199.3; 359/200.7; 359/209.1; 359/210.1; 359/224.1
(58) Field of Classification Search .............. 359/199.1, 359/199.3, 200.7, 224.1
See application file for complete search history.

(56) References Cited

U.S. PATENT DOCUMENTS 5,436,753 A * 7/1995 Hayakawa ............... 359/213.1
2002/0166894 A1 11/2002 Dvorkis et al.

FOREIGN PATENT DOCUMENTS

| JP | 62-090584 | 4/1987 |
|---|---|---|
| JP | 3-058014 | 3/1991 |
| JP | 5-083487 | 4/1993 |
| JP | 5-273485 | 10/1993 |
| JP | 5-297307 | 11/1993 |
| JP | 08-136845 A | 5/1996 |
| JP | 2002-040359 | 2/2002 |
| JP | 2002-131680 | 5/2002 |
| JP | 2003-329961 | 11/2003 |
| WO | WO-02/08818 | 1/2002 |

OTHER PUBLICATIONS

International Search Report for PCT Application No. PCT/JP2006/304267, dated Mar. 28, 2006.
Search Report issued in corresponding European Patent Application dated Aug. 4, 2010.

* cited by examiner

*Primary Examiner*—James Phan
(74) *Attorney, Agent, or Firm*—Edwards Angell Palmer & Dodge LLP

(57) ABSTRACT

An optical scanning actuator includes a leaf spring member that has a base end fixed and a tip end, a light source that is fitted to the leaf spring member, an electromagnetic driving unit that oscillates the tip end of the leaf spring member, and an optical element that is fitted to the leaf spring member and that is irradiated with light outgoing from the light source to reflect or refract the light to thereby scan the light.

20 Claims, 8 Drawing Sheets

OPTICAL SCANNING ACTUATOR

BACKGROUND OF THE INVENTION

1. Field of the Invention

The present invention relates to an optical scanning actuator.

2. Description of the Related Art

Scanning laser radar devices, laser scanners, laser printers, laser markers, and object surveillance devices, for example, are known examples of devices that use a laser scanning device. Among these devices, the scanning laser radar device, which is deployed for prevention of vehicle collision, uses a scanning device having a leaf-spring type optical scanning actuator. In the leaf-spring type optical scanning actuator, an optical element such as a reflective mirror is fitted to a leaf spring member. The base of the leaf spring member is fixed and the tip is oscillated by an electromagnetic driving unit. A light beam from a light source fitted at a predetermined spot distinct from the spot where the leaf spring member is disposed, is scanned by the optical element by reflecting or refracting the light beam (see Patent document 1). Compared to a motor-type optical scanning actuator in which the light beam is oscillated by rotating the reflective mirror using a motor, the leaf-spring type optical scanning actuator has a simpler structure and is smaller, more rugged, and economical.

[Patent document 1] International Publication No. 02/008818 pamphlet

SUMMARY OF THE INVENTION

An optical scanning actuator disclosed in Patent document 1 is described below with reference to FIG. 14. A reflective mirror 3 is fitted to the tip end of a leaf spring member 2 whose base end is fitted on a fixed member 1. A light beam outgoing from a light source 4 fitted at a predetermined spot which is distinct from the fixed member 1 is reflected as a light beam L1 by the reflective mirror 3 at a neutral position P1. The extent to which the optical scanning actuator having such a structure can scan is limited to an angle (=scanning angle) formed between the light beam L1 and a light beam L2, which is the light beam outgoing from the light source 4 reflected by the reflective mirror 3 at a swung position P2.

To enable the actuator disclosed in Patent document 1 to scan light across a significantly wide angle like a low-speed follow-up device of a vehicle, the light beam outgoing from the light source 4 must be received and reflected within the range of oscillation of the leaf spring member 2. To achieve this, the actuator needs to be provided with a reflective mirror 5 larger than the reflective mirror 3, as shown in FIG. 15. Thus, a larger angle (scanning angle) θ2 (which is >θ1) is formed between the light beam reflected as the light beam L1 by the reflective mirror 5 at the neutral position P1 and the light beam reflected as L3 by the reflective mirror 5 at a swung position P3. However, this would mean that the leaf spring member 2 has to support a heavy and large reflective mirror 5, hindering stabilized oscillation of the leaf spring member 2 and making it difficult to sustain high-speed scanning, thus adversely affecting scanning performance such as responsiveness.

It is an object of the present invention to provide an optical scanning actuator that achieves a wide scanning angle with a simple structure while preserving all the advantages of a leaf-spring type optical scanning actuator.

MEANS FOR SOLVING PROBLEM

An optical scanning actuator includes a leaf spring member that has a base end fixed and a tip end, a light source that is fitted to the leaf spring member, an electromagnetic driving unit that oscillates the tip end of the leaf spring member, and an optical element that is fitted to the leaf spring member and that is irradiated with light outgoing from the light source to reflect and refract the light to thereby scan the light.

Further, in the optical scanning actuator according to a second aspect of the present invention, the optical element may be fitted to the tip end of the leaf spring member orthogonal to an outgoing direction of the light beam outgoing from the light source and may be a lens that refracts the light beam outgoing from the light source.

Still further, in the optical scanning actuator according to a third aspect of the present invention, the optical element may be fitted to the tip end of the leaf spring member inclined at an angle relative to an outgoing direction of the light beam outgoing from the light source and may be a reflective mirror that reflects the light beam outgoing from the light source.

Still further, in the optical scanning actuator according to a fourth aspect of the present invention, the light source may be fitted to a base end of a slit running from the tip end of the leaf spring member to the base end of the leaf spring member.

Still further, in the optical scanning actuator according to a fifth aspect of the present invention, the light source may be fitted to one of the edges in a width direction on the leaf spring member.

Still further, in the optical scanning actuator according to a sixth aspect of the present invention, the light source may be fitted on a side of the leaf spring member.

Still further, in the optical scanning actuator according to a seventh aspect of the present invention, the leaf spring member may include a plurality of leaf springs joined by a joint, and the light source may be fitted to the joint.

Still further, the optical scanning actuator according to an eighth aspect of the present invention may be deployed in an on-board laser scanning mechanism for detecting obstacles such as vehicle ahead and pedestrians.

Still further, the optical scanning actuator according to a ninth aspect of the present invention may be deployed in a laser scanning mechanism as a part of an infrastructure detecting obstacles such as vehicle ahead and pedestrians.

Still further, the optical scanning actuator according to a tenth aspect of the present invention may be deployed in a crime-prevention or care-providing laser radar scanning mechanism for detecting conditions prevailing indoors such as any change in the conditions and human activity.

In the optical scanning actuator according to the present invention, a light source is fitted to a leaf spring member, enabling the light source to follow the movement of an optical element, which oscillates with the leaf spring member, obviating the need for a large optical element, and preventing a resulting deterioration of scanning performance. Thus, an optical scanning actuator that achieves a wide scanning angle with a simple structure while preserving all the advantages of a leaf-spring type optical scanning actuator is realized.

DETAILED DESCRIPTION OF EXEMPLARY EMBODIMENTS

First Embodiment

Figure 1:
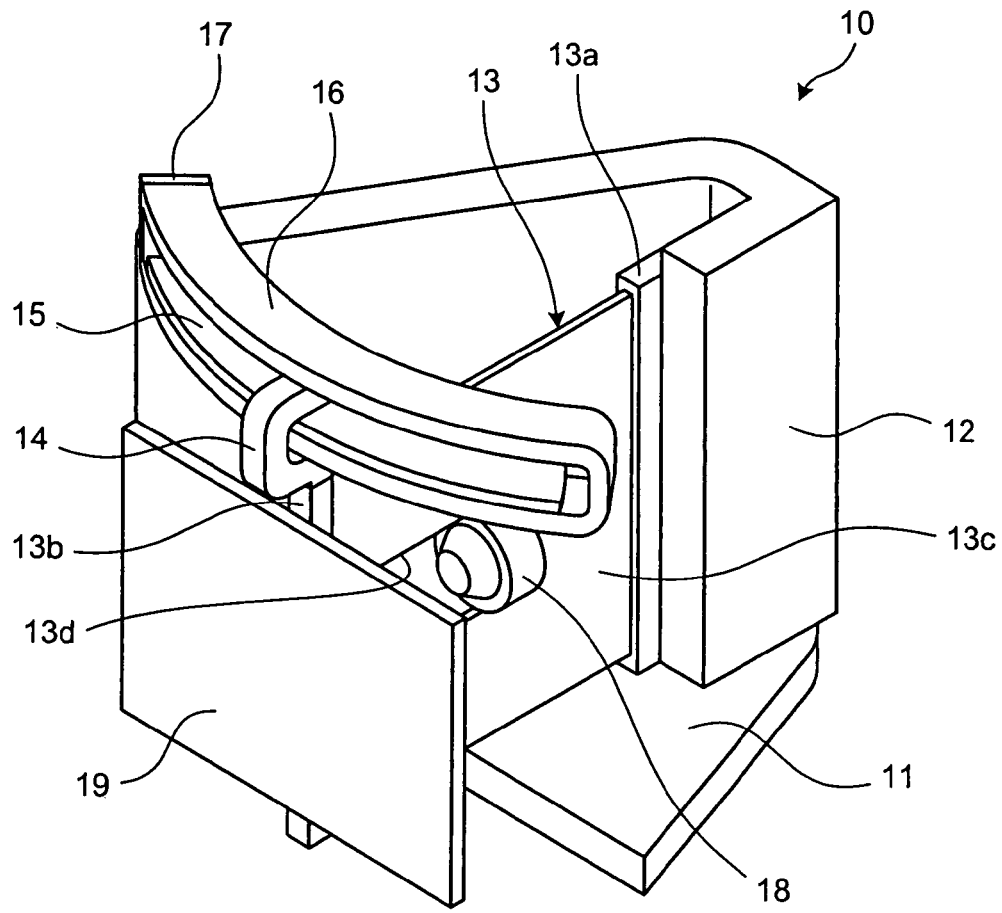
FIG. 1 is a perspective view of an optical scanning actuator according to a first embodiment of the present invention.
Figure 2:
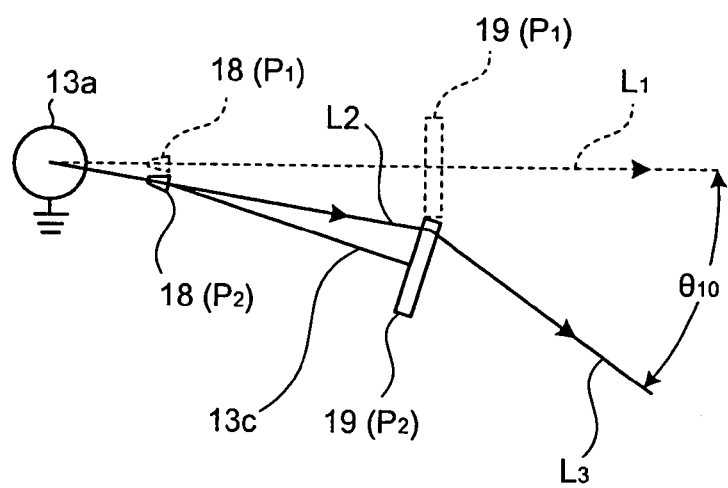
FIG. 2 is a schematic for explaining a principle of the optical scanning actuator shown in FIG. 1 for scanning a light beam.

An optical scanning actuator according to a first embodiment of the present invention is described below with reference to the accompanying drawings. FIG. 1 is a perspective view of an optical scanning actuator according to the first embodiment of the present invention. FIG. 2 is a schematic for explaining the principle of the optical scanning actuator shown in FIG. 1 for scanning a light beam.

As shown in FIG. 1, an optical scanning actuator (hereinafter, "actuator") 10 includes a leaf spring member 13, a coil 14, a light source 18, and a lens 19. As shown in FIG. 1, the leaf spring member 13 includes a base-end frame 13a and a tip-end frame 13b, supporting therebetween a leaf spring 13c. The base-end frame 13a is fixed to a supporting member 12 fitted to a base 11. A slit 13d runs from the tip end towards the base end of the leaf spring 13c. The light source 18 is fitted at the base end of the slit 13d. The leaf spring 13c is a thin leaf made of a springy material such as beryllium copper, phosphor bronze, or stainless steel, and is flexible orthogonal to the leaf surface. A flexible printed board with conductor patterns formed thereon is bonded to the leaf spring 13c. The flexible printed board supplies electric power to the light source 18 and the coil 14. If the leaf spring 13c is made of copper, the leaf spring 13c can be divided into a ground portion and an electric power receiving portion with an insulator therebetween, and the leaf spring 13c itself can be used for supplying electric power.

The coil 14 is disposed above the tip-end frame 13b, and forms an electromagnetic driving unit along with a permanent magnet 15 set in a yoke 16 as shown in FIG. 1. The permanent magnet 15 is set along the arc of the yoke 16 in the lower portion within the yoke 16. The yoke 16 is a planar arc shaped soft magnetic member made of pure iron, for example, and has the coil 14 around it. One end of the yoke 16 is supported by a bracket 17 on the upper edge of the supporting member 12. Depending on the direction of the current flowing through the coil 14, the Lorentz force is generated towards the left or the right along the arc of the yoke, which is disposed transverse to a flux produced between the permanent magnet 15 and the yoke 16. The coil 14 moves due to the Lorentz force, causing the leaf spring member 13 to oscillate. The oscillation range of the leaf spring member 13 will be the range in which the Lorentz force and the opposing bending force counterbalance each other. An alternating current of 10 to 100 Hz flows through the coil 14.

A light-emitting element such as a laser diode (LD) or a light-emitting diode (LED) that emits spot-type parallel light beams is used as the light source 18. As shown in FIG. 1, the light source 18 is fitted at the base end of the slit 13d in the leaf spring 13c. The light source 18 follows the movement of the lens 19, which oscillates with the leaf spring member 13. The magnitude of movement of the light source 18 is proportional to the magnitude of movement of the lens 19, and can be set to any value according to the shape of the leaf spring 13c or where the light source is fitted to the leaf spring 13c.

As shown in FIG. 1, the lens 19 is fitted to the tip-end frame 13b of the leaf spring member 13, and refracts the light beam outgoing from the light source 18. The lens 19 is disposed orthogonal to the outgoing direction of the light beam from the light source 18. However, the lens 19 can be disposed at any angle relative to the outgoing direction of the light beam as long as wide angle scanning of the light beam is enabled. A light Fresnel lens is used as the lens 19 so as not to obstruct the oscillation of the leaf spring member 13.

When scanning the light beam outgoing from the light source 18, the current flowing through the coil 14 of the actuator 10 causes the leaf spring member 13 to oscillate. As the light source 18 is fitted to the leaf spring 13c, that is, to the base end of the slit 13d of the leaf spring member 13, when the leaf spring member 13 starts to oscillate from a neutral position P1, a light beam L1 outgoing from the light source 18 at the neutral position P1 passes through the lens 19, also at the neutral position P1 and, as shown in FIG. 2, propagates straight ahead. As the light source 18 also shifts when the oscillating leaf spring member 13 shifts to a swung position, an optical axis of the outgoing light beam never fails to fall on the lens 19.

However, as shown in FIG. 2, the magnitude to which the leaf spring 13c bends at the spot where the light source 18 is fitted is small, a light beam L2 outgoing from the light source 18 becomes incident on the outer periphery of the lens 19, which has now shifted to a swung position P2, is diffracted by a huge angle, and comes out of the lens 19 as a light beam L3. Thus, fitting the light source 18 to the oscillating leaf spring member 13 enables the actuator 10 to scan the light beam outgoing from the light source 18 by up to a scanning angle of θ10.

Figure 3:
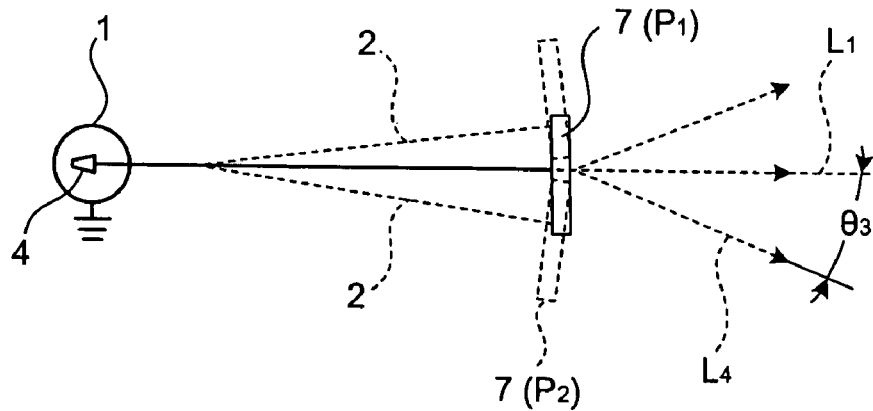
FIG. 3 is a schematic for explaining a principle of a conventional optical scanning actuator for scanning a light beam.

In the conventional actuator in which the light source is fixed to a supporting member, and in which a lens 7 similar to the lens 19 is fitted to the tip end of the leaf spring member 2, as shown in FIG. 3, when the leaf spring member 2 is not oscillating, the light beam outgoing from the light source 4 passes through the lens 7 at the neutral position P1, and propagates straight ahead as the light beam L1. When the leaf spring member 2 starts oscillating, and as a result, the lens 7 shifts to the swung position P2, as shown in FIG. 3, the light beam becomes incident on the outer periphery of the lens 7, and comes out of the lens 7 as a refracted light beam L4, yielding a smaller scanning angle of θ3 (which is less than θ10) due to restricted oscillation range of the lens 7.

Figure 4:
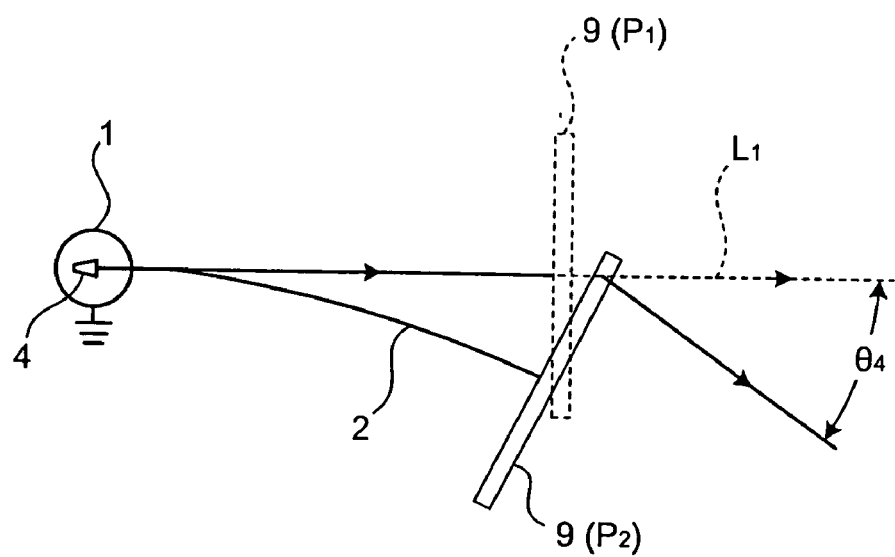
FIG. 4 is a schematic for explaining a principle used in the optical scanning actuator shown in FIG. 3 for scanning a light beam, wherein the optical scanning actuator includes a large lens to increase a scanning angle.

If a lens 9 that is larger than the lens 7 is used in the conventional actuator as shown in FIG. 4, and the leaf spring member 2 is made to oscillate with a greater amplitude than that shown in FIG. 3, a scanning angle of θ4 (which is equal to θ10), which is larger than the scanning angle of θ3 can be obtained. However, the scanning performance such as responsiveness will be adversely affected due to increased size and the weight.

Thus, in the actuator 10 according to the present invention in which the light source 18 is fitted to the leaf spring member 13, the light beam from the light source 18 follows the movement of the lens 19 which oscillates with the leaf spring member 13, thereby causing the optical axis of the outgoing light beam to never fail to fall on the lens 19. As a result, with a simple structural modification, a wider scanning angle of the light outgoing from the light source 18 than that of a conventional actuator can be achieved while preserving all the advantages of a leaf-spring type optical scanning actuator.

Figure 5:
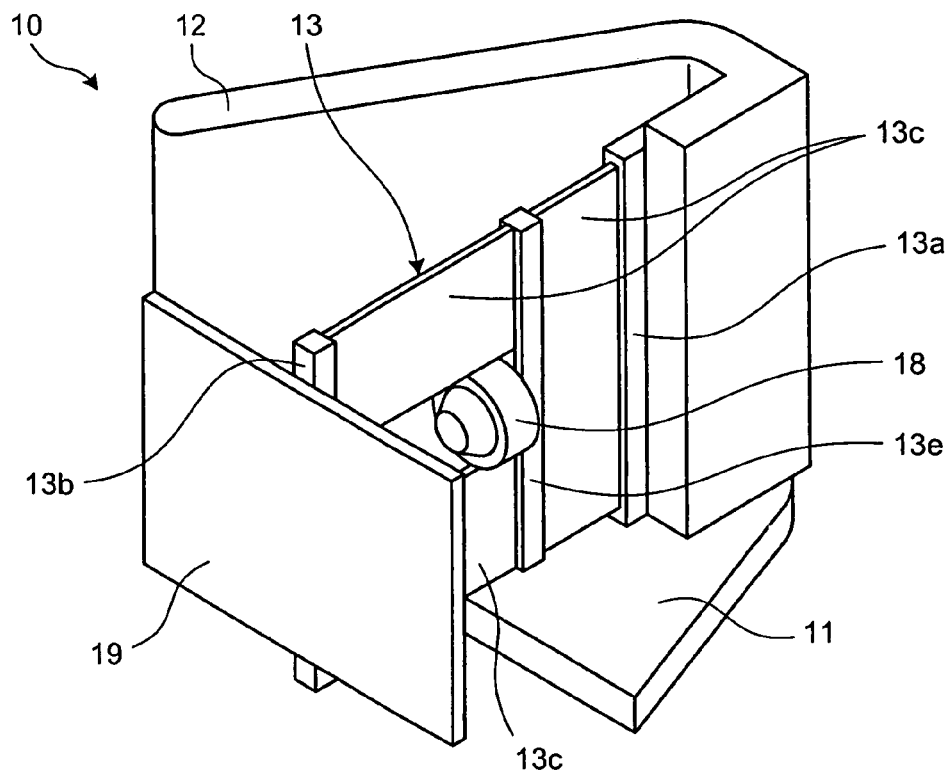
FIG. 5 is a perspective view of a first modification of the optical scanning actuator according to the first embodiment.

In one variation of the actuator 10, as shown in FIG. 5, a plurality of leaf springs 13c can be provided with a joint 13e joining the leaf springs 13c, and the light source 18 can be fitted to the joint 13e. The coil 14, the permanent magnet 15, and the yoke 16 are not shown in the actuator shown in FIG. 5 as well as in FIGS. 6, 7, 10, 11, and 12 that will be referred to in the following description.

Figure 6:
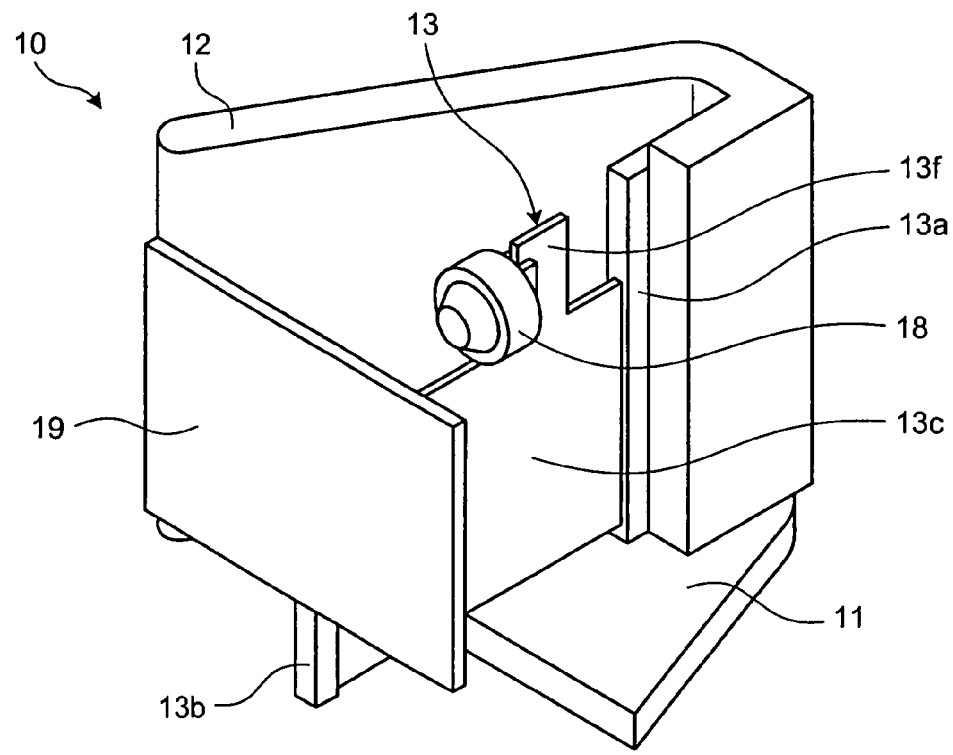
FIG. 6 is a perspective view of a second modification of the optical scanning actuator according to the first embodiment
Figure 7:
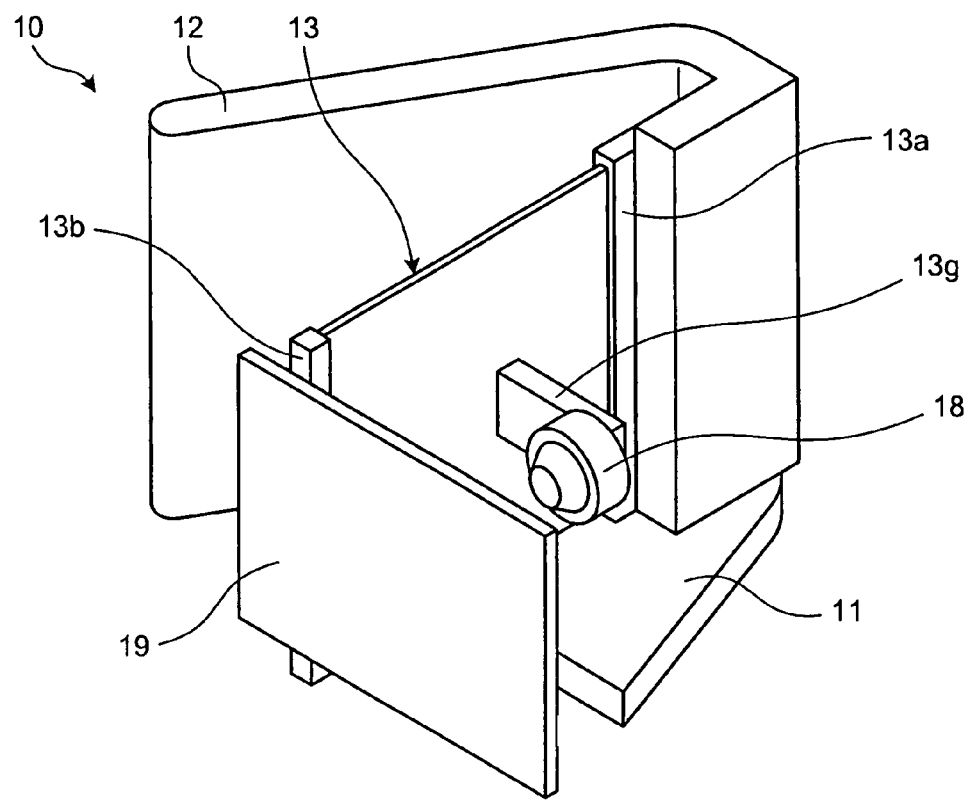
FIG. 7 is a perspective view of a third modification of the optical scanning actuator according to the first embodiment.

In another variation of the actuator 10, as shown in FIG. 6, the light source 18 can be fitted to a flange 13f provided on one of the top edges in a width direction on the leaf spring 13c. In yet another variation, as shown in FIG. 7, the light source 18 can be fitted to a bracket 13g provided on a side of the leaf spring 13c. In these modifications of the actuator 10, the magnitude of shift of the light source 18 with the oscillation of the leaf spring member 13 can be set by changing the position of the flange 13f and the bracket 13g in the length direction of the leaf spring 13c.

Second Embodiment

Figure 8:
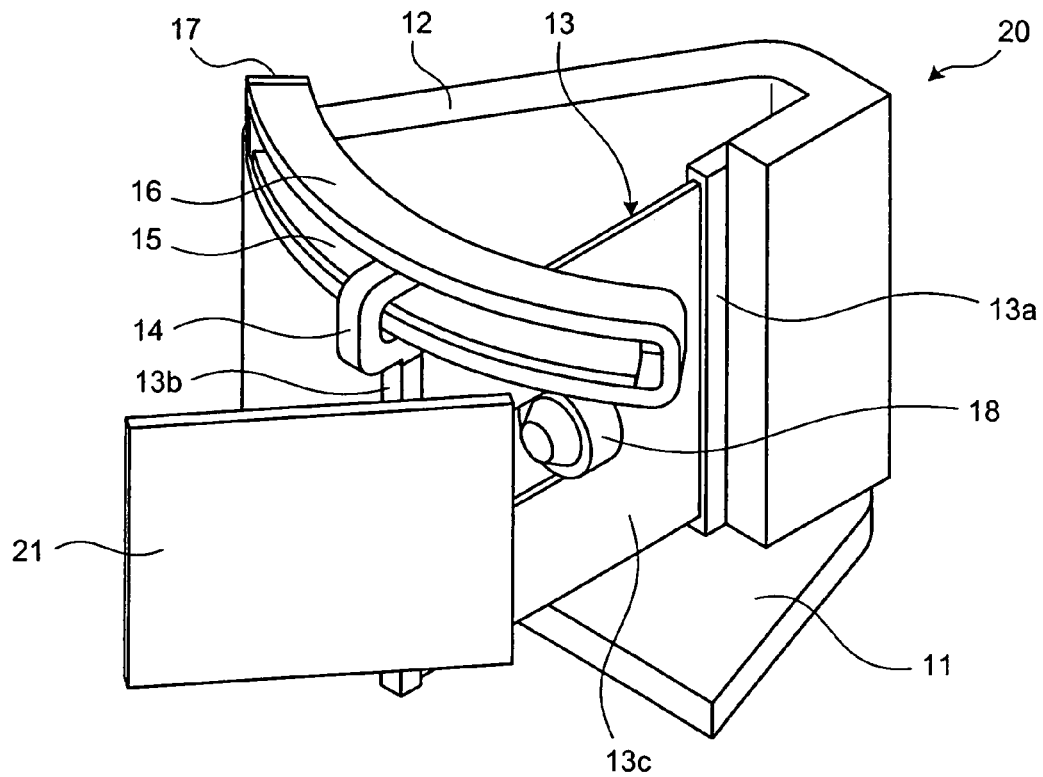
FIG. 8 is a perspective view of an optical scanning actuator according to a second embodiment of the present invention.
Figure 9:
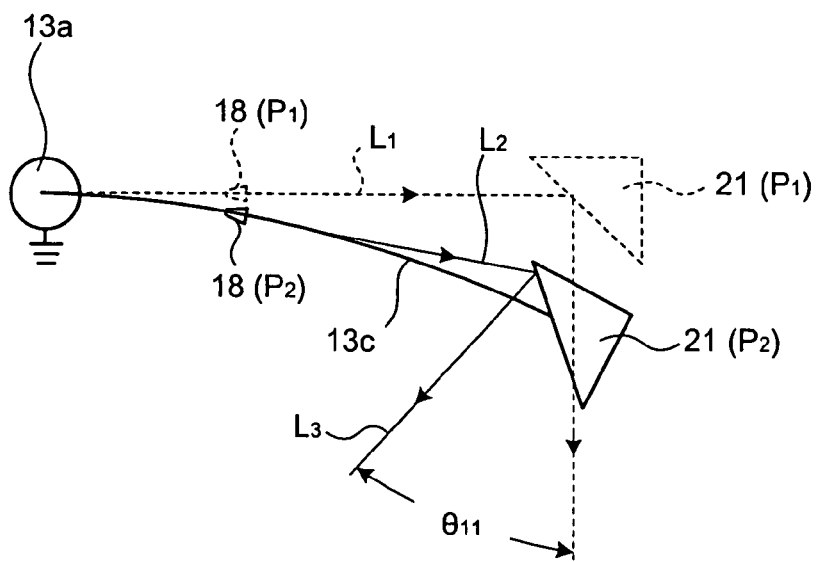
FIG. 9 is a schematic for explaining a principle of the optical scanning actuator shown in FIG. 8 for scanning a light beam.

A second embodiment of the actuator according to the present invention is described below with reference to the accompanying drawings. The optical element fitted to the leaf spring member in the actuator according to the first embodiment is a lens, whereas a reflective mirror is used as the optical element in the actuator according to the second embodiment. FIG. 8 is a perspective view of the optical scanning actuator according to the second embodiment. FIG. 9 is a schematic for explaining the principle of the optical scanning actuator shown in FIG. 8 for scanning the light beam. The parts of the optical scanning actuator in FIGS. 8 and 9 that are identical to those of the actuator 10 according to the first embodiment have been assigned the same reference numerals.

In an actuator 20, a reflective mirror 21 that refracts the light beam outgoing from the light source 18 is fitted to the tip-end frame 13b of the leaf spring member 13. The reflective mirror 21 is fitted to the tip-end of the leaf spring member 13 inclined at 45° relative to the outgoing direction of the light beam outgoing from the light source 18. The reflective mirror 21 can be fitted at any angle as long as it can reflect the light beam outgoing from the light source 18 enabling wide-angle scanning.

Thus, when scanning the light beam outgoing from the light source 18, the current flowing through the coil 14 of the actuator 20 causes the leaf spring member 13 to oscillate. As the light source 18 is fitted at the base end of the slit 13d of the leaf spring 13c, when the leaf spring member 13 starts to oscillate from the neutral position P1, the light beam L1 outgoing from the light source 18 at the neutral position P1 is reflected by the reflecting mirror 21 and, as shown in FIG. 9, its propagation direction is deflected by 90°. As shown in FIG. 9, when the leaf spring member 13 starts oscillating and as a result the light source 18 shifts to the swung position P2, the magnitude to which the leaf spring 13c bends at the spot P2 where the light source 18 is fitted is small. Therefore, as shown in FIG. 9, the light beam L2 outgoing from the light source 18 at the swung position P2 is reflected as a light beam L3 by the outer periphery of the reflective mirror 21 that has shifted to the swung position P2.

Figure 15:
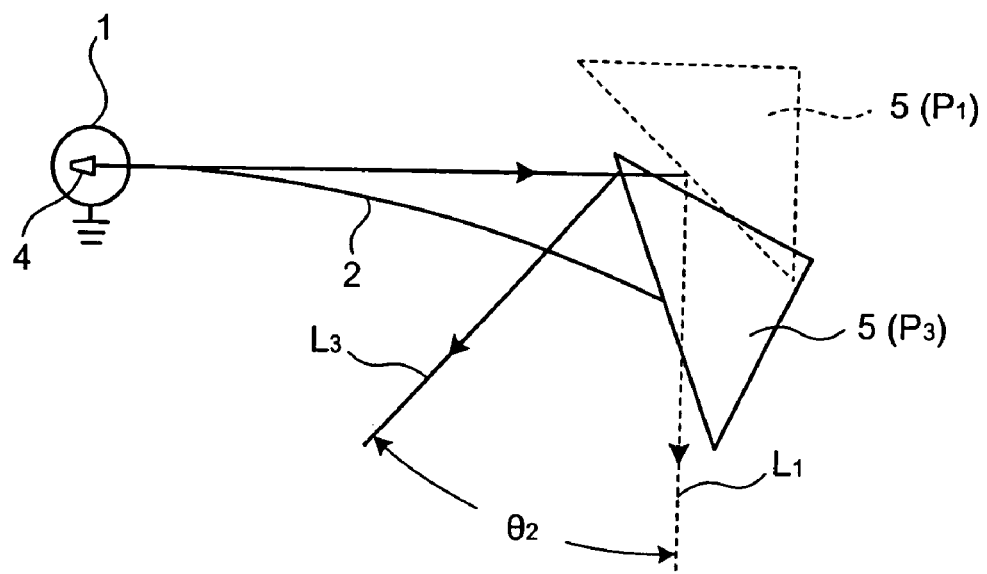
FIG. 15 is a schematic for explaining how an operating angle can be widened by using a larger reflective mirror in the actuator shown in FIG. 14.

Thus, fitting the light source 18 to the oscillating leaf spring member 13 enables the actuator 20 to scan the light beam outgoing from the light source 18 by up to a scanning angle of θ11. The scanning angle θ11 is equal to the scanning angle θ2 of the conventional actuator shown in FIG. 15 that uses the large reflective mirror 5 (θ11=θ2). Thus, in the actuator 20, a wide scanning angle is achieved without having to use the large reflective mirror 5 by fitting the light source 18 to the leaf spring member 13, enabling the light source 18 to shift with the left spring member 13.

Figure 10:
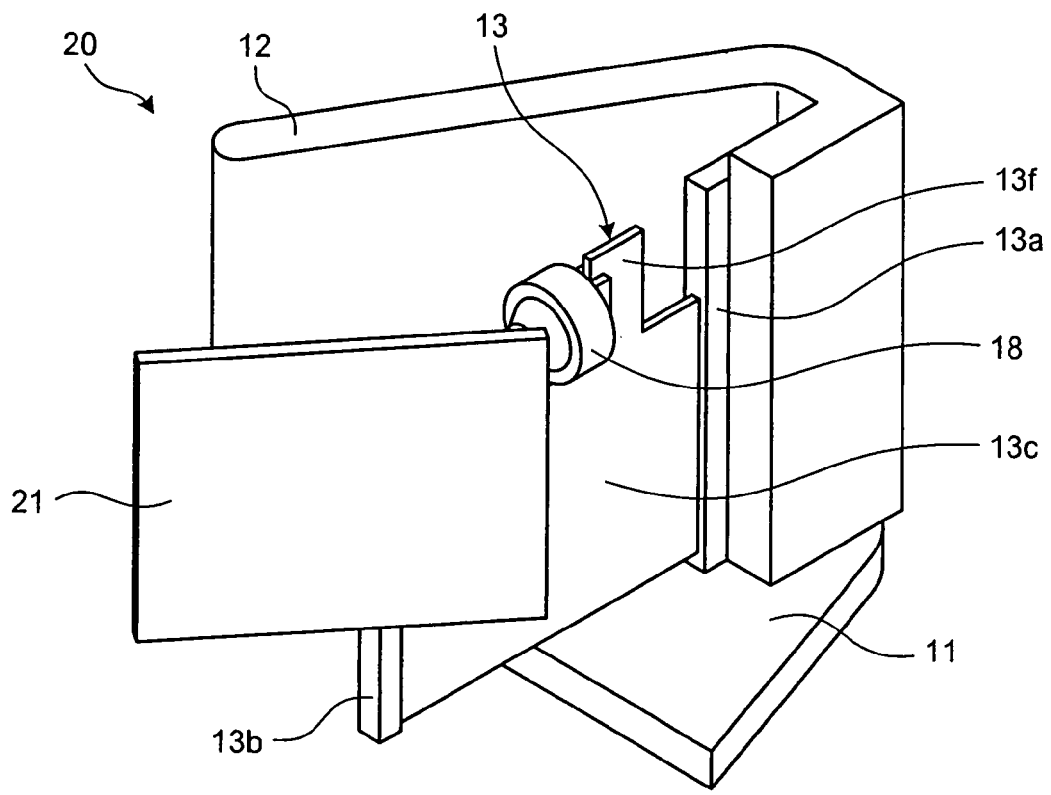
FIG. 10 is a perspective view of a first modification of the optical scanning actuator according to the second embodiment.
Figure 11:
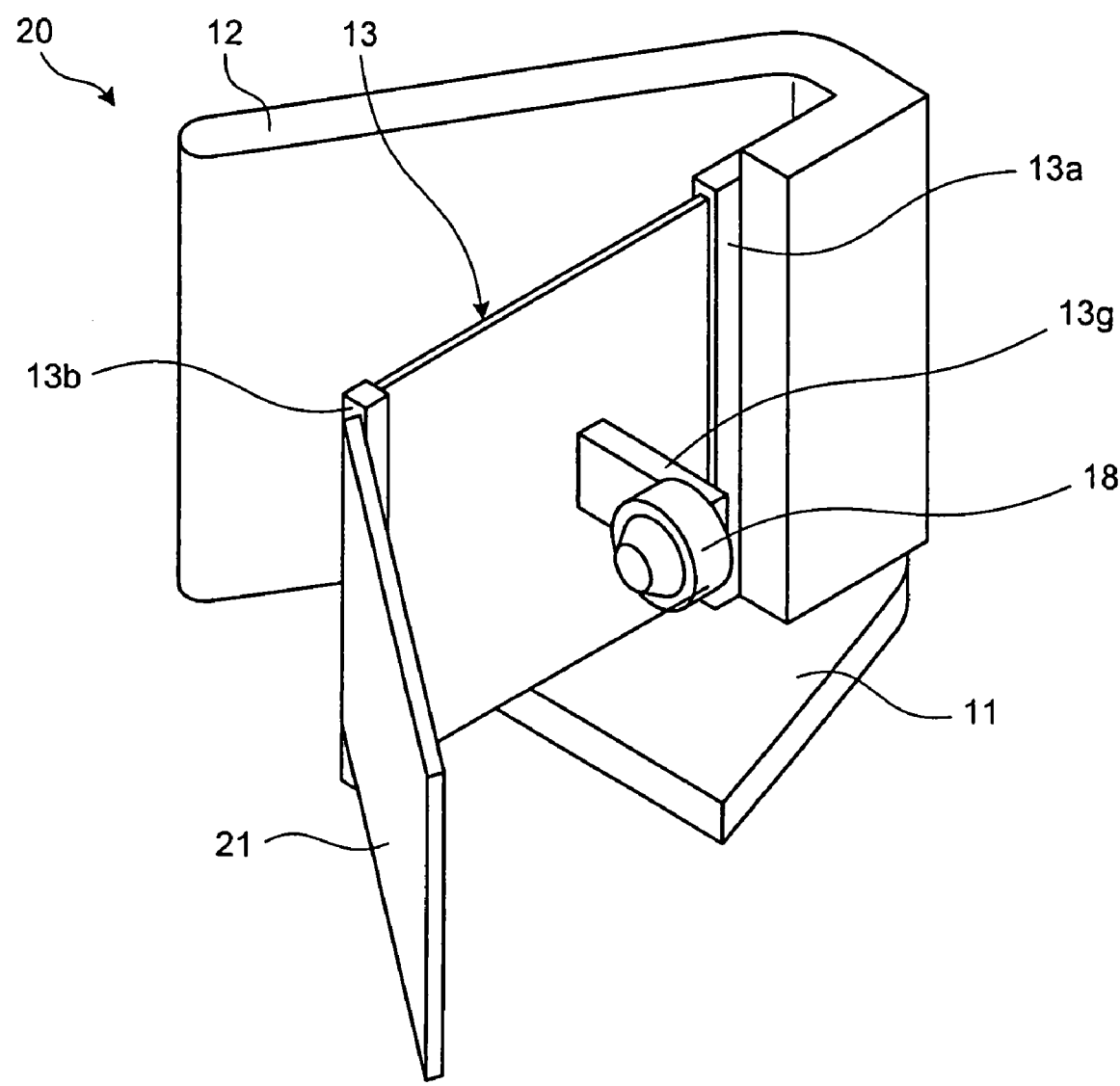
FIG. 11 is a perspective view of a second modification of the optical scanning actuator according to the second embodiment.

In one variation of the actuator 20, as shown in FIG. 10, the light source 18 can be fitted to the flange 13f provided on one of the top edges in a width direction on the leaf spring 13c. In another variation, as shown in FIG. 11, the light source 18 can be fitted to the bracket 13g provided on a side of the leaf spring 13c. In these modifications of the actuator 20, the magnitude of shift of the light source 18 with the oscillation of the leaf spring member 13 can be set by changing the position of the flange 13f and the bracket 13g in the length direction of the leaf spring 13c. In yet another variation of the actuator 20, similarly to the actuator 10 shown in FIG. 5, the light source 18 can be fitted to the joint 13e between the leaf springs 13c.

Figure 12:
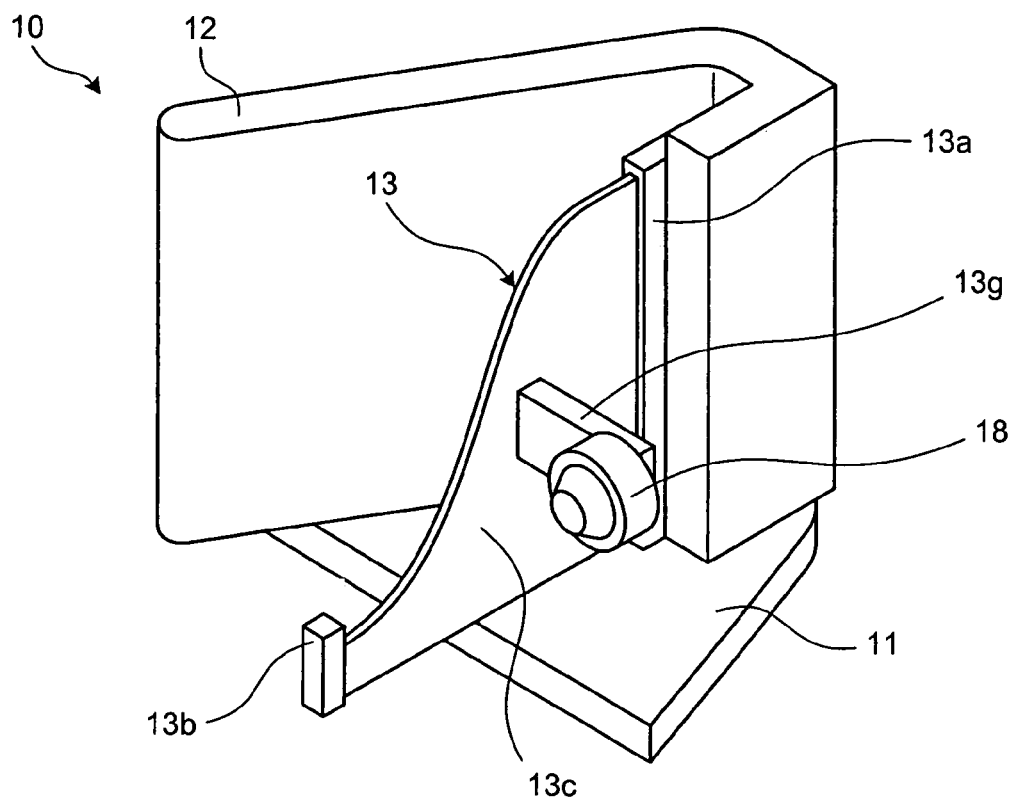
FIG. 12 is a perspective view of a first modification of a leaf spring used in the optical scanning actuator according to the present invention.
Figure 13:
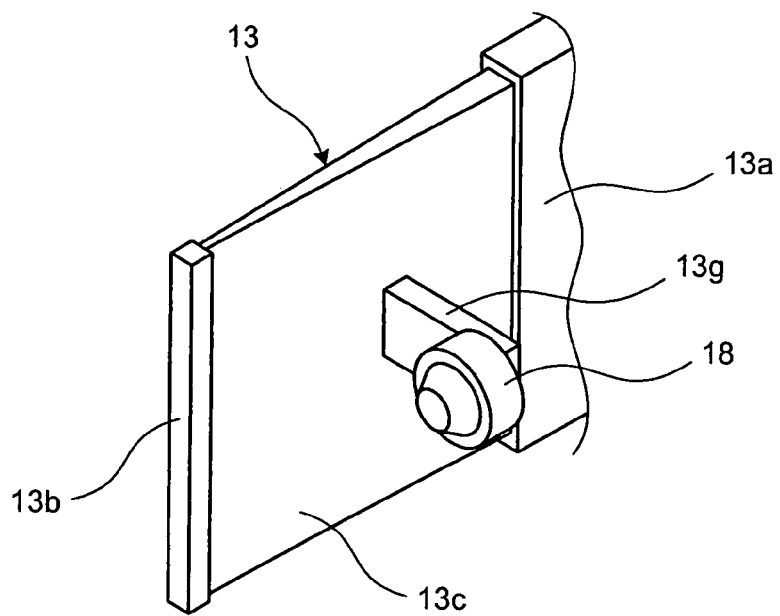
FIG. 13 is a perspective view of a second modification of the leaf spring used in the optical scanning actuator according to the present invention.
Figure 14:
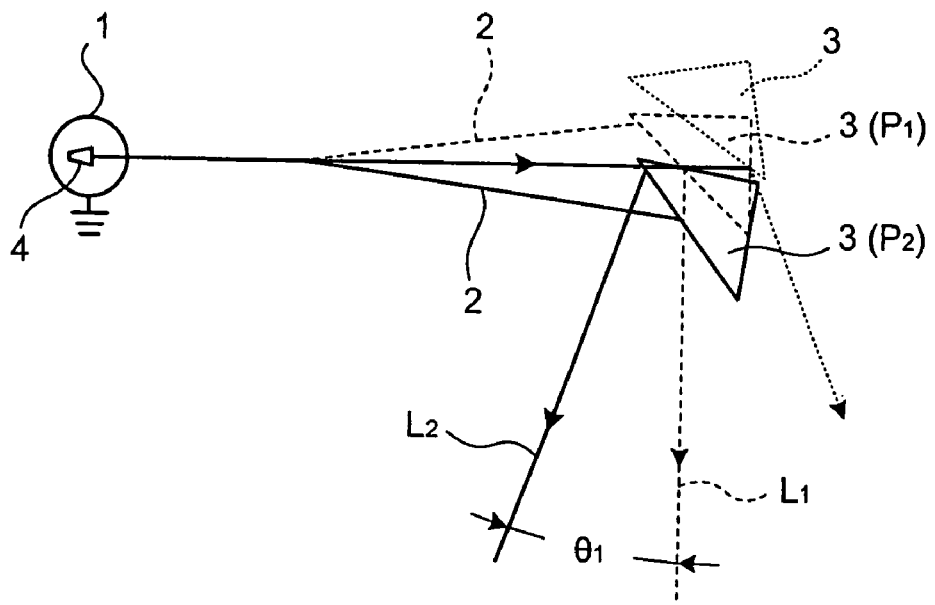
FIG. 14 is a schematic diagram of the conventional optical scanning actuator and a schematic for explaining a principle of the conventional optical scanning actuator for scanning a light beam.

Other modifications can also be made in the actuators according to the first and second embodiments. For example, as shown in FIG. 12, in the actuator 10 according to the first embodiment, a significant portion of the tip end of the leaf spring 13c can be ablated, causing the section modulus to drop towards the tip end of the leaf spring 13c leading to a significant bend on the tip end side. A drop in the section modulus towards the tip end of the leaf spring 13c leading to a significant bend on the tip end side can also be achieved by modifying the leaf spring 13c so that its thickness decreases gradually from the base-end frame 13a towards the tip-end frame 13b, as shown in FIG. 13.

The optical element used in the actuators according to the first and the second embodiments are lens and reflective mirror, respectively. However, other optical elements such as a hologram element and a prism can be used.

The optical scanning actuator according to the present invention can be deployed in an on-board laser radar scanning mechanism for detecting obstacles such as vehicle ahead and pedestrian, or in a laser radar scanning mechanism which is part of an infrastructure for detecting obstacles such as vehicle ahead and pedestrian, or in a crime-prevention or care-providing laser radar scanning mechanism for detecting conditions prevailing indoors such as any change in the conditions and human activity.

INDUSTRIAL APPLICABILITY

Thus, the optical scanning actuator according to the present invention is useful as a leaf-spring type optical scanning actuator that scans the light beam outgoing from a light source by reflecting or refracting the light beam, and is particularly useful as an optical scanning actuator with a wide scanning angle.

The invention claimed is:

1. An optical scanning actuator comprising:
    a leaf spring member that has a base end fixed and a tip end;
    a light source that is fitted to the leaf spring member;
    an electromagnetic driving unit that oscillates the tip end of the leaf spring member; and
    an optical element that is fitted to the leaf spring member and that is irradiated with light outgoing from the light source to reflect or refract the light to thereby scan the light.

2. The optical scanning actuator according to claim 1, wherein the optical element is fitted to the tip end of the leaf spring member orthogonal to an outgoing direction of the light beam outgoing from the light source and is a lens that refracts the light beam outgoing from the light source.

3. The optical scanning actuator according to claim 2, wherein the light source is fitted to a base end of a slit running from the tip end of the leaf spring member to the base end of the leaf spring member.

4. The optical scanning actuator according to claim 2, wherein the light source is fitted to one of the edges in a width direction on the leaf spring member.

5. The optical scanning actuator according to claim 2, wherein the light source is fitted on a side of the leaf spring member.

6. The optical scanning actuator according to claim 2, wherein the leaf spring member includes a plurality of leaf springs joined by a joint, and
    wherein the light source is fitted to the joint.

7. The optical scanning actuator according to claim 1, wherein the optical element is fitted to the tip end of the leaf spring member inclined at an angle relative to an outgoing direction of the light beam outgoing from the light source and is a reflective mirror that reflects the light beam outgoing from the light source.

8. The optical scanning actuator according to claim 7, wherein the light source is fitted to a base end of a slit running from the tip end of the leaf spring member to the base end of the leaf spring member.

9. The optical scanning actuator according to claim 7, wherein the light source is fitted to one of the edges in a width direction on the leaf spring member.

10. The optical scanning actuator according to claim 7, wherein the light source is fitted on a side of the leaf spring member.

11. The optical scanning actuator according to claim 7, wherein the leaf spring member includes a plurality of leaf springs joined by a joint, and
    wherein the light source is fitted to the joint.

12. The optical scanning actuator according to claim 1, wherein the light source is fitted to a base end of a slit running from the tip end of the leaf spring member to the base end of the leaf spring member.

13. The optical scanning actuator according to claim 12, wherein the leaf spring member includes a plurality of leaf springs joined by a joint, and
    wherein the light source is fitted to the joint.

14. The optical scanning actuator according to claim 1, wherein the light source is fitted to one of the edges in a width direction on the leaf spring member.

15. The optical scanning actuator according to claim 14, wherein the leaf spring member includes a plurality of leaf springs joined by a joint, and
    wherein the light source is fitted to the joint.

16. The optical scanning actuator according to claim 1, wherein the light source is fitted on a side of the leaf spring member.

17. The optical scanning actuator according to claim 16, wherein the leaf spring member includes a plurality of leaf springs joined by a joint, and
    wherein the light source is fitted to the joint.

18. The optical scanning actuator according to claim 1 deployed in an on-board laser scanning mechanism for detecting obstacles such as vehicle ahead and pedestrians.

19. The optical scanning actuator according to claim 1 deployed in a laser scanning mechanism as a part of an infrastructure detecting obstacles such as vehicle ahead and pedestrians.

20. The optical scanning actuator according to claim 1 deployed in a crime-prevention or care-providing laser radar scanning mechanism for detecting conditions prevailing indoors such as any change in the conditions and human activity.

* * * * *